United States Patent [19]

Sturm et al.

[11] 3,876,632
[45] Apr. 8, 1975

[54] BASICALLY SUBSTITUTED BENZENE-1,3-DISULFONAMIDES AND PROCESS FOR THEIR MANUFACTURE

[75] Inventors: Karl Sturm, Heidesheim, Rhine; Franz Starey, Frankfurt am Main, both of Germany

[73] Assignee: Hoechst Aktiengesellschaft, Frankfurt, Main, Germany

[22] Filed: Aug. 9, 1973

[21] Appl. No.: 386,863

[30] Foreign Application Priority Data
July 7, 1973 Germany............................ 2334562
Aug. 12, 1972 Germany............................ 2239846

[52] U.S. Cl. ......... 260/239.7; 260/239.65; 424/229
[51] Int. Cl............................................. C07d 51/70
[58] Field of Search..................... 260/239.7, 239.65

[56] References Cited
FOREIGN PATENTS OR APPLICATIONS
1,119,290  7/1962  Germany ........................ 260/397.7

*Primary Examiner*—Henry R. Jiles
*Assistant Examiner*—C. M. S. Jaisle
*Attorney, Agent, or Firm*—Curtis, Morris & Safford

[57] ABSTRACT

Basically substituted 4-piperazino-benzene-1,3-disulfonamides, their non toxic salts and a process for their manufacture which process comprises introducing either the piperazino radical in 4-position or the basic group in 6-position into corresponding 1,3-benzene sulfonamides having an appropriate group in 4- or 6-position in usual manner or by oxidizing compounds containing an allyl group which is interrupted by an S or an SO-group.

7 Claims, No Drawings

BASICALLY SUBSTITUTED BENZENE-1,3-DISULFONAMIDES AND PROCESS FOR THEIR MANUFACTURE

The present invention relates to basically substituted benzene-1,3-disulfonamides and a process for their manufacture.

The benzene-1,3-disulfonamides of this invention have the general formula I

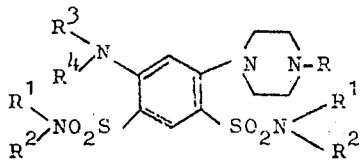

in which R stands for a low molecular weight alkyl radical, $R^1$ and $R^2$ each stands for hydrogen atoms, methyl or ethyl groups, $R^3$ stands for a hydrogen atom or a low molecular weight alkyl radical and $R_4$ stands for a hydrogen atom, an allyl, a low molecular weight alkyl radical which may be interrupted by O—, S—, SO—, $SO_2$— or N-alkyl groups, and the nitrogen may also be a member of a 5- or 6-membered saturated heterocyclic ring, a cycloalkyl or cycloalkylalkyl radical having up to 8 carbon atoms or an aralkyl radical which may carry in the aromatic ring as substituents one or two halogen atoms, alkyl or alkoxy radicals or an optionally mono- or dialkyl-substituted amino group or $R^4$ stands for the 2-furylmethyl, 2-tetrahydrofuryl-methyl or a pyridyl-methyl radical or the group

a pyrrolidino, piperidino, hexamethyleneimino, morpholino or a 4-alkyl-piperazine-1-yl radical.

This invention also provides the non toxic acid salts of these compounds.

This invention also relates to a process for the manufacture of these compounds which comprises reacting a compound of the general formula II

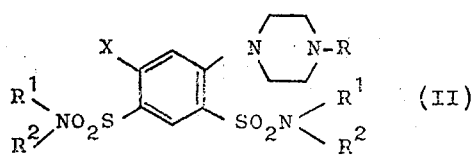

in which X is a halogen atom or an alkyl or aryl sulfonyloxy radical, with an amine of the general formula III

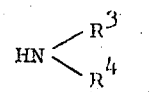

or a compound of the general formula IV

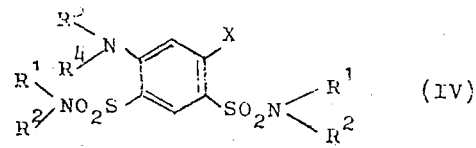

in which X is defined as above, with a piperazine derivative of the general formula V

R, $R^1$, $R^2$, $R^3$ and $R^4$ being defined as in claim 1, or methylating a compound of the general formula I in which at least one of the radicals $R^1$ to $R^4$ stands for hydrogen, or oxidizing compounds of the general formula I in which $R^4$ stands for an alkyl radical interrupted by S or SO and optionally converting the compounds obtained subsequently into non toxic acid salts by treating them with non toxic acids.

R, $R^3$ and $R^4$ stand, for example, for the low-molecular weight radicals methyl, ethyl or one of the isomeric propyl, butyl, amyl and hexyl groups. $R^4$ may, also, stand for a cyclopentyl, cyclohexyl, cycloheptyl, cyclopentylmethyl, or cyclohexylmethyl radical, benzyl, one of the isomeric phenylethyl or phenylpropyl radicals or one of the isomeric 2-propoxyethyl or 2-butoxyethyl radicals, the 3-methoxypropyl, the 3-ethoxypropyl radical, one of the isomeric 3-propoxypropyl radicals, one of the isomeric 2-propylthioethyl radicals, one of the isomeric 2-butylthioethyl radical, the 3-methylthiopropyl radical, the 3-ethylthiopropyl radical, the 2-methylsulfinylethyl radical, the 2-ethylsulfinyl-ethyl radical, one of the isomeric 2-propylsulfinylethyl radicals, one of the isomeric 2-butylsulfinylethyl radicals, one of the isomeric 2-propylsulfonylethyl radicals, one of the isomeric 2-butylsulfonylethyl radicals, the 2-dimethylaminoethyl radical, the 3-dimethylaminopropyl radical, the 3-diethylaminopropyl radical, the 2-pyrrolidinoethyl radical, the 3-pyrrolidinopropyl radical, the 2-morpholinoethyl radical, the 3-morpholinopropyl radical, the 2-piperidinoethyl radical, the 3-piperidino propyl radical, or a chlorobenzyl, bromobenzyl, methylbenzyl, ethylbenzyl, methoxybenzyl, or ethoxybenzyl radical, wherein the substituents of the phenyl ring may be placed in any position. The aromatic ring of the benzyl radical may also carry 2 substituents in any position, for example, $R^4$ may stand for dichlorobenzyl, chlorobromobenzyl, chloromethylbenzyl, chloromethoxybenzyl, dimethylbenzyl, dimethoxybenzyl, methylmethoxybenzyl or piperonyl, and it may also stand for one of the isomeric methoxy-phenyl-ethyl radicals or for the 3- or 4-pyridylmethyl radical, the 2-furylmethyl radical, a 3- or 4-aminobenzyl radical, a 2-, 3- or 4-methylaminobenzyl radical or a 2-, 3- or 4-dimethylaminobenzyl radical.

Furthermore, the group

may also stand for a N-methylpiperazino, N-ethylpiperazino, or one of the isomeric N-propyl- or N-butylpiperazino radicals.

German Pat. No. 1,119,290 describes the manufacture of the starting compounds of the general formulae II and IV in which X stands for a chlorine or bromine atom. According to the method of this patent they are obtained in simple manner by reacting a benzenedisulfonamide of the general formula VI

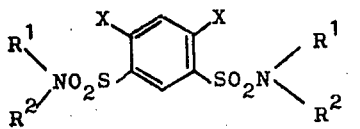 (VI)

in which the two radicals X stand for chlorine or bromine atoms, with a corresponding amine, in which reaction only one halogen atom is easily exchanged since the reaction temperatures for replacing the second halogen atom are considerably above the minimum temperature required for the first halogen atom.

According to that method, the starting compounds of the general formulae II and IV, in which X stands for a fluorine or iodine atom or an alkyl or arylsulfonyloxy radical, may also be prepared, these starting compounds being advantageously derived from compounds of the general formula VI in which the two radicals X are identical.

The technical synthesis of the products of the invention is mainly carried out with the intermediates of the general formulae II and IV in which X stands for a chlorine atom. Starting compounds in which X is a fluorine atom are advantageous if an especially temperature-sensitive basic radical is to be introduced. The fluorine atom can be exchanged against the amino radical in most cases already at temperatures about 30°C below the minimum reaction temperature required for the reaction of the corresponding chlorine compound with the same base.

To prepare the products of the invention of the general formula I in which the two basic radicals are identical, i.e., if the group

stands for the piperazino radical

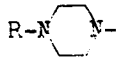

and the two radicals R are identical, it is advantageous not to isolate the intermediate products of the general formulae II or IV, but to heat a compound of the general formula VI, preferably the dichloro compound, to temperatures at which both radicals X begin to react successively.

The reaction of the compounds of the general formula II with ammonia or amines of the general formula III and that of compounds of the general formula IV with piperazino derivatives of the general formula V may be carried out with or without solvents.

When working with the addition of a solvent, a molar equivalent of the corresponding basic component is sufficient when the acid HX set free is bound by adding at least a molar equivalent of a tertiary base, for example, triethyl amine, N-ethyl-piperidine, N,N-dimethyl aniline, pyridine or quinoline, or an inorganic base, for example, sodium bicarbonate, potassium carbonate, NaOH or KOH. These additives are not necessary when the basic reactant is a piperazino derivative the second nitrogen atom of which is still basic enough after the reaction to bind the acid HX set free. Generally, when working in a solvent, the addition of a base to the acid compound will be dispensable and the base to be reacted of the formulae III or V will be used in a two to three times molar excess.

When working without solvent an excess amount of the corresponding basic reactant must be used to keep the reaction mixture in the liquid state.

The solvents advantageously used are ethylene glycol, diethylene glycol and the mono- or diethers thereof, for example, glycolmonoethyl ether, glycolmonobutyl ether or diethyleneglycoldimethyl ether, because they are miscible with water and chemically inert towards the basic component and have such a high boiling temperature that the reaction need not be effected in an autoclave. Dimethyl formamide, dimethyl acetamide, dimethyl sulfoxide and hexamethyl phosphoric acid triamide may also be used. When the reaction is carried out in an autoclave under pressure, methanol, ethanol and the isomeric propanols and butanols may also be used as solvents in addition to water.

Basic reactants of the general formula V are, for example, N-methyl, N-ethyl, N-(n-propyl), N-isopropyl, N-(n-butyl), N-isobutyl and N-isoamyl, piperazine. Basic reactants of the general formula III may be, in addition to the above piperazine derivatives, for example, ammonia, methyl amine, ethyl amine, n-propyl amine, isopropyl amine, n-butyl amine, isobutyl amine, the isomer amyl and hexyl amines, allyl amine, cyclopentyl amine, cyclohexyl amine, cyclohexylmethyl amine, dimethyl amine, diethylamine, diisopropyl amine, di-n-butyl amine, N-methylethyl amine, N-methyl-isobutyl amine, 2n-butoxyethyl amine, 2-ethylthioethyl amine, pyrrolidine, piperidine, morpholine, benzyl amine, N-methyl-benzyl amine, N-ethyl-benzyl amine, 2-phenyl-ethyl amine, 1-phenyl-ethyl amine, 2-methoxy-benzyl amine, 2,4-dimethoxy-benzyl amine, piperonyl amine, N-methylpiperonyl amine, 3,4-dimethoxy-benzyl amine, 2-chlorobenzyl amine, 3-chlorobenzyl amine, N-methyl-4-chlorobenzyl amine, 2,4-dichlorobenzyl amine, 2-methyl-benzyl amine, 4-methylbenzyl-amine, N-ethyl-4-methylbenzyl amine, 4-bromo-benzyl amine, 4-dimethylaminobenzyl amine, 3-pyridylmethylmethyl amine, 3-morpholinopropyl amine and 2-piperidino ethyl amine.

The reaction temperatures required are determined by the radical X to be exchanged and by the nature of the basic reactant. When X is a chlorine atom, these temperatures range from 120° to 180°C. Piperazine derivatives, pyrrolidine, piperidine and morpholine react most easily, whereas the reaction with ammonia and sterically hindered amines occurs most slowly. When replacing the radical Cl for X by tosyloxy or mesyloxy radicals, the reaction temperature must be increased by about 20°C. When replacing it by fluorine, the temperature can be reduced by about 30°C.

The reaction products of the general formula I in which $R^1$ or $R^1$ and $R^2$ each stands for hydrogen atoms are amphoteric and can be dissolved in aqueous lyes and in aqueous acids. Depending on the total number of nitrogen atoms in the two basic substituents, their reaction is neutral to slightly basic. If neither of the radicals $R^1$ and $R^2$ is a hydrogen atom the products of the invention are moderately strong bases, especially when both basic substituents are piperazine derivatives, and can be dissolved as such only in aqueous acids. If the pH is isoelectric, i.e., in the range of about 7.0 to 9.5, the products of the invention are difficultly soluble in water. The reaction solution, therefore, is advantageously worked up in such a manner that the cooled reaction solution, when it is very viscous, is diluted with methanol or ethanol and the mixture is then introduced in a large amount of water. On adjusting to an isoelectric pH, the product of the invention generally precipitates as crystals. Amorphous precipitates are obtained, in general, if a difficultly water-soluble basic reaction component is used in excess and therefore, precipitates, too. In such cases the precipitate is advantageously separated by decanting or shaking with ethyl acetate and the crude product is triturated with petroleum ether, cyclohexane, diethyl ether or diisopropylether, the amine causing impurities being dissolved and the product of the invention generally remaining as crystals. The amphoteric products of the invention are advantageously purified by recrystallization from water, alcohols or alcohol-water mixtures.

Basic products having sulfonamide groups which each carry two substituents are more advantageously recrystallized from ethyl acetate, ethyl acetate-petroleum ether, butyl acetate, diisopropyl ether, acetonitrile, nitromethane or related solvents.

The compounds obtained which contain a thioether grouping may afterwards be oxidized in usual manner to yield the corresponding sulfoxides or sulfones, or the compounds which contain a sulfoxide grouping may be oxidized to yield the corresponding sulfones.

Oxidization is advantageously carried out with $H_2O_2$ in glacial acetic acid. For the conversion of a thioether into the sulfoxide, 1.1 equivalents, and into the sulfone, an excess (about 3 equivalents), of $H_2O_2$ are used.

In addition to the products specified in the Examples, the following compounds may be prepared according to the invention:

4-benzylamino-6-(4-ethylpiperazine-1-yl)-benzene-1,3-disulfonic acid-bis-methylamide, 4-benzylamino-6-(4-ethylpiperazine-1-yl)-benzene-1,3-disulfonic acid-bis-dimethylamide, 4-benzylamino-6-(4-n-propylpiperazine-1-yl)-benzene-bis-dimethylamide, 4-benzylamino-6-(4-methylpiperazine-1-yl)-benzenebis-diethylamide, 4-piperonylamino-6-(4-methylpiperazine-1-yl)-benzene-1,3-disulfonic acid-bis-dimethylamide, 4-(2-chlorobenzylamino)-6-(4-methylpiperazine-1-yl)-benzene-1,3-disulfonamide, 4-(2-chlorobenzylamino)-6-(4-methylpiperazine-1-yl)-benzene-1,3-disulfonic acid-bis-methylamide, 4-dimethylamino-6-(4-methylpiperazine-1-yl)-benzene-1,3-disulfonamide, 4-diethylamino-6-(4-methylpiperazine-1-yl)-benzene-1,3-disulfonic acid-bis-dimethylamide, 4-di-n-propylamino-6-(4-methylpiperazine-1-yl)-benzene-1,3-disulfonic acid-bis-methylamide, 4-amino-6-(4-methylpiperazine-1-yl)-benzene-1,3-disulfonic acid-bisdimethylamide, 4-(3-methoxybenzylamino)-6-(4-ethylpiperazine-1-yl)-benzene-1,3-disulfonamide, 4-(2-methoxy-4-chlorobenzylamin)-6-(4-methylpiperazine-1-yl)-benzene-1,3-disulfonamide, 4-(2,4-dimethoxy-benzylamino)-6-(4-methylpiperazine-1-yl)-benzene-1,3-disulfonamide, 4-(2,4-dimethoxybenzylamino)-6-(4-methylpiperazine-1-yl)-benzene-1,3-disulfonic acid-bis-dimethylamide, 4-(2-methyl-4-chlorobenzylamino)-6-(4-methylpiperazine-1-yl)-benzene-1,3-disulfonic acid-bis-dimethylamide, 4-isopropylamino-6-(4-methylpiperazine-1-yl)-benzene-1,3-disulfonamide, 4-piperidino-6-(4-ethylpiperazine-1-yl)-benzene-1,3-disulfonamide, 4-morpholino-6-(4-methylpiperazine-1-yl)-benzene-1,3-disulfonic acid-bis-dimethylamide, 4,6-bis-(4-ethylpiperazine-1-yl)-benzene-1,3-disulfonamide, 4-(N-methyltetrahydrofurfurylamino)-6-(4-methylpiperazine-1-yl)-benzene-1,3-disulfonic acid-bis-dimethylamide and the corresponding bis-diethyl-, bis-methyl- and bis-ethylamide, 4-(4-pyridylmethylamino)-6-(4-methylpiperazine-1-yl)-benzene-1,3-disulfonic acid-bis-dimethylamide and the corresponding bis-diethyl-, bis-methyl- and bis-ethylamide, 4-(4-dimethyl-aminobenzylamino)-6-(4-methylpiperazine-1-yl)-benzene-1,3-disulfonamide and the corresponding 1,3-disulfonic acid-bis-dimethylamide, 4-(2-diethylamino-ethylamino)-6-(4-methylpiperazine-1-yl)-1,3-disulfonic acid-bis-dimethylamide and the corresponding bis-diethyl-, bis-methyl- and bis-ethylamide, 4-(2-ethoxyethylamino)-6-(4-methylpiperazine-1-yl)-benzene-1,3-disulfonic acid-bis-dimethylamide and the corresponding bis-diethyl-, bis-methyl and bis-ethylamide, 4-(2-isobutoxyethylamino)-6-(4-methylpiperazine-1-yl)-benzene-1,3-disulfonamide and the corresponding 1,3-disulfonic acid-bis-dimethylamide and 1,3-disulfonic acid-bis-diethylamide, 4-(2-ethylthioethylamino)-6-(4-methylpiperazine-1-yl)-benzene-1,3-disulfonic acid-bis-dimethylamide and the corresponding bis-ethylamide and bis-diethylamide, 4-(2-n-propylsulfinylethylamino)-6-(4-methylpiperazine-1-yl)-benzene-1,3-disulfonic acid-bis-dimethylamide and the corresponding bis-diethylamide and bis-ethylamide, 4-(2-methylsulfonylethylamino)-6-(4-methylpiperazine-1-yl)-benzene-1,3-disulfonic acid-bis-dimethylamide and the corresponding bis-diethylamide, bis-methylamide and bis-ethylamide.

The products of the invention can afterwards be converted in usual manner into therapeutically suitable acid salts or alkali metal salts.

Salts of the compounds according to the invention suitable for therapeutical use are, preferably, acid salts, for example, the hydrochloride, sulfate, phosphate, methane sulfonate, p-toluene-sulfonate, maleate or citrate. For special purposes, alkali metal salts, preferably the monosodium salt or monopotassium salt, are also suitable.

As established by animal tests, the compounds of the invention have marked hypotensive properties and are administered per os, or by the intraduodenal and intravenous route. They have also a slight effect on dilating the coronary vessels and a positive inotropic effect. Because of the lack of other pharmaceutical properties and their very low toxicity, they are excellent agents for the treatment of high blood pressure, especially of essential hypertonia.

For example, 4-benzylamino-6-(4-methyl-piperazin-1-yl)-1,3-disulfonamide and the corresponding disulfonic acid-bis-dimethyl amide have especially suitable properties.

Suitable dosage unit forms of the preparations are, above all, tablets, dragees, capsules and suppositories which may contain per dosage unit between 10 and 200 mg of the active substance, either in free form or in the form of the abovementioned acid salts or alkali metal salts, in which case the dosage unit may contain up to 90 percent of the usual fillers and carriers.

For intravenous administration, there are especially used aqueous solutions of the acid salts of the compounds according to the invention in the form of ampoules having a content of 2 to 50 mg of the active substance in question.

All these preparations may contain other therapeutically active components suitable for the treatment of high blood pressure, for example, tranquilizers, such as meprobamate or barbiturates, and above all, saluretics, for example, furosemide or hydrochlorothiazide.

The following Examples illustrate the invention:

EXAMPLE 1

4,6-di-(4-methylpiperazine-1-yl)-benzene-1,3-disulfonamide 30.5 g of 4,6-dichlorobenzene-1,3-disulfonamide (0.1 mol) were heated under reflux with 40 g of N-methylpiperazine in 60 c.c. of diethyleneglycoldimethyl-ether for 2 hours. When the reaction solution is poured into 0.4 l of water, colorless crystals are precipitated. The solution is suction-filtered, washed with water and recrystallized from ethanol (50 percent). After drying on a steam bath, the compound obtained is dihydrate.

Yield: 32 g (68 percent of the theory), decomposition point: 253°C.

EXAMPLE 2

4-amino-6-(4-methylpiperazine-1-yl)-benzene-1,3-disulfonamide

A mixture of 57 g of 4-amino-6-chlorobenzene-1,3-disulfonamide (0.2 mol), 60 g of N-methylpiperazine and 40 c.c. of dimethyl formamide was heated under reflux for 3 hours internal temperature about 140°C). The reaction solution was poured into 0.6 l of water, the pH was adjusted to 5 with 2 N hydrochloric acid, the precipitate was recrystallized from water and dried on a steam bath. The hydrochloride of the base was obtained as the dihydrate.

Yield: 24 g (34 percent of the theory), melting point: 262°C.

EXAMPLE 3

4-benzylamino-6-(4-methylpiperazine-1-yl)-benzene-1,3-disulfonamide 40.6 g of 4-chloro-6-(4-methylpiperazine-1-yl)-benzene-1,3-disulfonamide-hydrochloride (0.1 mol) were stirred at 125 – 130°C with 110 g of benzylamine for 1 hour and the hot reaction solution was then poured into 0.6 l of water. The crystalline precipitate was suction-filtered and washed with water. The crude product was shortly boiled with 0.2 l of ethanol and suction-filtered after 2 hours, standing at room temperature.

Yield: 32 g (73 percent of the theory), melting point: 241°C

EXAMPLE 4

4-morpholino-6-(4-methylpiperazine-1-yl)-benzene-1,3-disulfonamide

The example was carried out in a manner analogous to that of example 3 using 120 c.c. of morpholine instead of benzyl amine.

Yield: 37 g (91 percent of the theory), decomposition point: 276°C

EXAMPLE 5

4-(2-phenyl-ethylamino)-6-(4-methylpiperazine-1-yl)-benzene-1,3-disulfonamide 40.6 g of 4-chloro-6-(4-methylpiperazine-1-yl)-benzene-1,3-disulfonamide-hydrochloride (0.1 mol) were stirred at 150°C for 2 hours with 120 c.c. of 2-phenylethyl amine and the hot solution was poured into 0.6 l of water. The precipitated oil was separated by decanting and washed several times with water while decanting, whereupon it slowly crystallized. It is purified by recrystallization from ethanol-water.

Yield: 20.5 g (45 percent of the theory), melting point: 217°–219°C

EXAMPLE 6

4-(2-methoxybenzylamine)-6-(4-methylpiperazine-1-yl)-benzene-1,3-disulfonamide

This example is carried out in a manner analogous to that of Example 3 using 100 c.c. of 2-methoxybenzylamine instead of benzylamine. Or pouring into 0.6 l of water, an oil separated. It was separated by decanting and treated at room temperature with 100 c.c. of ethanol, whereupon the reaction product precipitated as crystals. The product was purified by recrystallization from nitromethane.

Yield: 36.0 g (76 percent of the theory), decomposition point: 247°C

EXAMPLE 7

4-(N-methyl-benzylamino)-6-(4-methylpiperazine-1-yl)-benzene-1,3-disulfonamide-hydrochloride A mixture of 40.6 g of 4-chloro-6-(4-methylpiperazine-1-yl)-benzene-1,3-disulfonamide-hydrochloride and 120 c.c of N-methyl-benzylamine was heated to 150°C for 2 hours. On introducing the reaction mixture into 0.6 l of water, an oil precipitated. It was separated by decanting and freed from N-methylbenzyl amine by digesting repeatedly with petroleum ether. It was then dissolved in ethylacetate. On feeding in gaseous hydrochloric acid, the crystalline hydrochloride precipitated.

Yield: 16.7 g (34 percent of the theory), decomposition point: 233°C

EXAMPLE 8

4,6-di(4-methylpiperazine-1-yl)-benzene-1,3-disulfonic acid-bis-methyl amide

The example was carried out in a manner analogous to that described in example 1 using 33.3 g of 4,6-dichlorobenzene-1,3- disulfonic acid-bis-methyl amide (0.1 mol) instead of 4,6-dichlorobenzene-1,3-disulfonamide.

Yield: 29.0 g (63 percent of the theory), melting point: 232°–233°C

EXAMPLE 9

4,6-di(-methylpiperazine-1-yl)-benzene-1,3-disulfonic acid-bis-dimethyl amide

This example was carried out in a manner analogous to that of example 1, using 36.1 g of 4,6-dichlorobenzene-1,3-disulfonic acid-bis-dimethyl amide (0.1 mol) instead of 4,6-dichlorobenzene-1,3-disulfonamide.

Yield: 38.6 g (79 percent of the theory), melting point: 227°–228°C

EXAMPLE 10

4-benzylamino-6-(4-methylpiperazine-1-yl)-benzene-1,3-disulfonic acid-bis-methyl amide 39 g of 4-chloro-6-(4-methylpiperazine-1-yl)-benzene-1,3-disulfonic acid-bis-methyl amide (0.1 mol) were heated to 130°C for 2 hours with 120 c.c. of benzyl amine while stirring. Upon pouring the clear reaction solution subsequently into 1.2 l of water, the reaction product precipitated instantly as crystals. It was suction-filtered, washed with water and the moist product was recrystallized from ethanol-dimethylformamide.

Yield 29.5 g (63 percent of the theory), melting point: 233°–235°c

EXAMPLE 11

4-benzylamino-6-(4-methylpiperazine-1-yl)-benzene-1,3-disulfonic acid-bis-methyl amide In a manner analogous to that described in example 10, this example was carried out using 42.5 g of 4-chloro-6-(4-methylpiperazine -1-yl)-benzene-1,3-disulfonic acid-bis-dimethyl amide (0.1 mol) instead of the bis-methyl amide. The crude product was purified by recrystallization from ethanol.

Yield: 37.8 g (76 percent of the theory), melting point: 157°–158°C

To be converted into the monohydrochloride, 10 g of the base were suspensed in 0.1 l of water and 20 c.c. of 2 N hydrochloric acid were added in one jet while stirring. A clear solution was obtained from which the hydrochloride crystallized after cooling to 10°C and trituration. After washing with water, the product was dried on a steam bath.

Yield: 9.0 g, melting point: 272°–274°C

EXAMPLE 12

4-(2-methoxybenzylamino)-6-(4-methylpiperazine-1-yl)-benzene-1,3-disulfonic acid-bis-dimethyl amide 42.5 g of 4-chloro-6-(4-methylpiperazine-1-yl)-benzene-1,3-disulfonic acid-1,3-bis-dimethyl amide (0.1 mol) and 120 c.c of 2-methoxybenzyl amine were heated to 130°C for 2 hours. Upon pouring the reaction solution into 4 l of water, an oil separated, which was separated by decanting and dissolved in 1.0 l of isopropanol. 1.0 l of 1 N hydrochloric acid was added to the solution at room temperature. On trituration, the hydrochloride of the base precipitated as crystals.

Yield: 32.6 g (58 percent of the theory), melting point: 265°–266°C

EXAMPLE 13

4-piperonylamino-6-(4-methylpiperazine-1-yl)-benzene-1,3-disulfonic amide 40.6 g of 4-chloro-6-(4-methylpiperazine-1-yl)-benzene-1,3-disulfonic amide hydrochloride (0.1 mol) and 80 g of piperonyl amine were heated to 130°C for 2 hours. The reaction mixture was then introduced into 1.0 l of glacial acetic acid (10 percent), resinous side products were precipitated and the filtrate was adjusted at pH 7 with ammonia solution. The final product precipitated as a resin, and crystallized in the course of several days. It was suction-filtered, washed with ethanol and recrystallized from nitromethane.

Yield: 18.6 g (38 percent of the theory), melting point: 245°C and decomposition.

EXAMPLE 14

4-(4-methylbenzylamino)-6-(4-methylpiperazine-1-yl)-benzene-1,3-disulfonamide

This example was carried out in a manner analogous to that of Example 13, using 100 g of 4-methyl-benzyl amine instead of the piperonyl amine.

Yield: 23.5 g (52 percent of the theory), melting point: 215°–216°C.

EXAMPLE 15

4-benzylamino-6-(4-n-butylpiperazine-1-yl)-benzene-1,3-di-sulfonic amide

A mixture of 37.6 g of 4-benzylamino-6-chlorobenzene-1,3-disulfonamide (0.1 mol) and 40 g of N-(n-butyl)-piperazine was stirred at 125°C for 2 hours. Upon pouring the reaction solution into 0.8 l of water the final product precipitated in the form of pure crystals. The product was washed with water and purified by recrystallization from ethanol.

Yield: 32.5 g (67 percent of the theory), melting point: 212°–213°C

EXAMPLE 16

4-benzylamino-6-(4-ethylpiperazine-1-yl)-benzene-1,3-disulfonamide

The process of this example was analogous to that described in Example 15 using 40 g of N-ethylpiperazine instead of the butyl derivative. The crude product was purified by recrystallization from methanol.

Yield: 25.0 g (55 percent of the theory), melting point: 240°–244°C

EXAMPLE 17

4-benzylamino-6-(4-n-propylpiperazine-1-yl)-benzene-1,3-disulfonamide

The process of this example was analogous to that of example 15 using 40 g of N-(n-propyl)-piperazine instead of the butyl derivative.

Yield: 27.6 g (59 percent of the theory), melting point: 200°–201°C

EXAMPLE 18

4-cyclohexylamino-6-(4-methylpiperazine-1-yl)-benzene-1,3-disulfonamide 36.8 of 4-cyclohexylamino-6-chlorobenzene-1,3-disulfonamide (0.1 mol) were mixed with 60 c.c. of N-methylpiperazine and the mixture was heated to 130°C for 2 hours while stirring. The yellowish, clear reaction solution was then cooled to about 80°C, diluted with the same volume of ethanol and the mixture was introduced into 0.5 l of water while stirring. The reaction product which precipitated as crystals was suctionfiltered, washed with water and recrystallized from methanol.
Yield: 18.4 g (42 percent of the theory), melting point: 214°–216°C

EXAMPLE 19

4-isobutylamino-6-(4-methylpiperazine-1-yl)-benzene-1,3-disulfonamide 34.2 g of 4-isobutylamino-6-chlorobenzene-1,3-disulfonamide (0.1 mol) were reacted in a manner analogous to that of Example 18 with N-methylpiperazine. The crude product, which precipitated as crystals upon being introduced into water, was purified by recrystallization from nitromethane.
Yield: 17.5 g (42 percent of the theory), melting point: 194°–195°C

EXAMPLE 20

4-pyrrolidino-6-(4-methylpiperazine-1-yl)-benzene-1,3-disulfonamide 34.0 g of 4-pyrrolidino-6-chlorobenzene-1,3-disulfonamide (0.1 mol) were reacted with N-methylpiperazine in a manner analogous to that of Example 18, and the crude product was recrystallized from nitromethane.
Yield: 21.2 g (52 percent of the theory), melting point: 225°–227°C and decomposition.

EXAMPLE 21

4-cyclohexylmethylamino-6-(4-methylpiperazine-1-yl)-benzene-1,3-disulfonamide 38.2 g of 4-cyclohexylmethylamino-6-chlorobenzene-1,3-disulfonamide (0.1 mol)) were reacted in a manner analogous to that of Example 18 with N-methylpiperazine and the crude product was recrystallized from nitromethane.
Yield: 23.1 g (52 percent of the theory), melting point: 224°C

EXAMPLE 22

4-(4-chlorobenzylamino)-6-(4-methylpiperazine-1-yl)-benzene-1,3-disulfonamide 41.0 g of 4-(4-(4-chlorobenzylamino)-6-chlorobenzene-1,3-disulfonamide (0.1 mol) were reacted in a manner analogous to that of example 18 with N-methylpiperazine and the crude product was recrystallized from nitromethane.
Yield: 18.4 g (45 percent of the theory), melting point: 212°–214°C

EXAMPLE 23

4-(2-tetrahydrofurylmethylamino)-6-(4-methylpiperazine-1-yl)-benzene-1,3-disulfonamide A mixture of 11.1 g of 4-(2-tetrahydrofurfurylamino)-6-chlorobenzene-1,3-disulfonamide (30 mmols) and 15 c.c. of N-methylpiperazine was heated to 130°C for 2 hours while stirring. The reaction solution was poured into 0.2 l of water. The precipitate in the form of crystals was suction-filtered and washed with water. The crude product was recrystallized from ethanol. After drying on a steam bath the compound still contained 1 equivalent of crystal-ethanol.
Yield: 9.8 g (68 percent of the theory), melting point: 128°C and gas development.

EXAMPLE 24

4-(2-ethoxyethylamino)-6-(4-methylpiperazine-1-yl)-benzene-1,3-disulfonamide 10.8 g of 4-(2-ethoxyethylamino)-6-chlorobenzene-1,3-disulfonamide (30 mmols) were reacted in a manner analogous to that of Example 1 with N-methylpiperazine and the crude product was recrystallized from ethanol-dimethylformamide (10:1).
Yield: 8.1 g (64 percent of the theory), melting point 220°–221°C

EXAMPLE 25

4-(2-methoxyethylamino)-6-(4-methylpiperazine-c.c.-yl)-benzene-1,3-disulfonamide A mixture of 20 g of 4-chloro-6-(4-methylpiperazine-1-yl)-benzene-1,3-disulfonamide hydrochloride (50 mmols), 26 c.c. of N-methylpiperazine and 50 c.c of ethylene glycol was stirred at 130°C for 3 hours and the hot reaction solution was poured into 0.2 l of water. The crystalline precipitate was suction-filtered, thoroughly washed with water and the moist product was recrystallized from methanol.
Yield: 8.1 g (40 percent of the theory), melting point: 216°–217°C

EXAMPLE 26

4-(2,2-diethoxyethylamino)-6-(4-methylpiperazine-1-yl)-benzene-1,3-disulfonamide A mixture of 16.1 g of 4-(2,2-diethoxyethylamino)-6-chlorobenzene-1,3-disulfonamide (40 mmols), 16 c.c. of N-methylpiperazine and 20 c.c. of ethylene glycol was stirred for 3 hours at 130°C and then introduced into 0.4 l of water. A brownish amorphous precipitate was obtained which crystallized over night under water. The air-dried crude product was first recrystallized from ethyl acetate-diisopropyl ether (10:1) and then from ethyl acetate-ethanol (3:1).
Yield: 8.1 g (43 percent of the theory), melting point: 210°–212°C.

EXAMPLE 27

4-(3-pyridylmethylamino)-6-(4-methylpiperazine-1-yl)-benzene-1,3-disulfonamide 15.1 g of 4-(3-pyridylmethylamino)-6-chlorobenzene-1,3-disulfonamide (40 mmols) were reacted in a manner analogous to that of Example 4 with N-methylpiperazine and the crystalline crude product was recrystallized from ethanol-dimethylformamide (about 4:1). After drying on the steam bath the compound still contained 1 equivalent of crystal-ethanol.
Yield: 11.6 g (59 percent of the theory), melting point: 149°C and gas development.

EXAMPLE 28

4-(N-methyl-2-tetrahydrofurylmethylamino)-6-(4-methylpiperazine-1-yl)-benzene-1,3-disulfonamide 16.5 g of 4-(N-methyl-2-tetrahydrofurylmethylamino)-6-chlorobenzene-1,3-disulfonamide (40 mmols) were reacted in a manner analogous to that described in Example 4 with N-methylpiperazine and the crystalline crude product was recrystallized from ethanol.
Yield: 13.0 g (68 percent of the theory), melting point: 176°–177°C

EXAMPLE 29

4-(3-methoxy-2-propylamino)-6-(4-methylpiperazine-1-yl)-benzene-1,3-disulfonic acid-bis-dimethylamide-hydrochloride 19.5 g of 4-(3-methoxy-2-propylamino)-6-chlorobenzene-1,3-disulfonic acid-bis-dimethylamide (47 mmols) and 40 c.c. of N-methylpiperazine were stirred at 130°C for 2 hours and the reaction solution was introduced into 0.25 l of water. The amorphous precipitate was separated by decanting and recrystallized from 100 c.c. of hydrochloric acid.
Yield: 17.4 g (72 percent of the theory), melting point: 235°–237°C

EXAMPLE 30

4-allylamino-6-(4-methylpiperazine-1-yl)-benzene-1,3-disulfonamide-hydrochloride 13 g of 4-allylamino-6-chlorobenzene-1,3-disulfonamide (40 mmols) and 26 c.c. of N-methylpiperazine were stirred at 135°C for 3 hours. The reaction solution was added to 0.2 l of water and adjusted at pH 9 with 2 N hydrochloric acid. The crystalline precipitate was suction-filtered and recrystallized from 0.3 l of 0.2 N hydrochloric acid.
Yield: 6.7 g (39 percent of the theory), decomposition point: 255°C.

EXAMPLE 31

4-(2-ethylthioethylamino)-6-(4-methylpiperazine-1-yl)-benzene-1,3-disulfonamide-hydrochloride A mixture of 15.0 g of 4-(2-ethylthioethylamino)-6-chlorobenzene-1,3-disulfonamide (40 mmols), 20 c.c. of N-methylpiperazine and 25 c.c. of ethylene glycol was stirred at 130°C for 3 hours, then poured into 0.2 l of water. The crystalline precipitate was suction-filtered and recrystallized first with 1 N hydrochloric acid, then with ethanol (85 percent).
Yield: 7.9 g (41 percent of the theory), decomposition point: 241°C

EXAMPLE 32

4-(2-methylthioethylamino)-6-(4-methylpiperazine-1-yl)-benzene-1,3-disulfonic acid-bis-dimethylamide-hydrochloride The compound was prepared from 19.0 g of 4-(2-methylthioethylamino)-6-chlorobenzene-1,3-disulfonic acid-bis-dimethylamide (40 mmols) and 30 c.c. of N-methylpiperazine in a manner analogous to that described in Example 9.
Yield: 14.3 g (69 percent of the theory), melting point: 230°–231°C

EXAMPLE 33

4-(2-methylsulfonylethylamino)-6-(4-methylpiperazine-1-yl)-benzene-1,3-disulfonamide 12.2 g of 4-(2-ethylsulfonylethylamino)-6-chlorobenzene-1,3-disulfonamide (30mmols) and 25 c.c. of N-methylpiperazine were stirred at 130°C for 2 hours and the solution was introduced into 0.2 l of water. The crystalline precipitate was suction-filtered, dissolved while hot in dimethyl formamide and precipitated with about 5 times the volume of ethanol to form crystals. After washing with ethanol drying followed on the steam bath.
Yield: 10.8 g (76 percent of the theory), decomposition point: 239°C.

EXAMPLE 34

4-(2-methylsulfonylethylamino)-6-(4-ethylpiperazine-1-yl)-benzene-1,3-disulfonamide This product was prepared from 11.7 g of 4-(2-methylsulfonylethylamino)-6-chlorobenzene-1,3-disulfonamide (30 mmols) and 25 c.c. of N-ethylpiperazine in a manner analogous to that of example 11.
Yield: 8.7 g (62 percent of the theory), decomposition point: 242°C

EXAMPLE 35

4-(2-diethylaminoethylamino)-6-(4-methylpiperazine-1-yl)-benzene-1,3-disulfonamide 12.2 g of 4-chloro-6-(4-methylpiperazine-1-yl)-benzene-1,3-disulfonamide-hydrochloride (30 mmols) and 24 g of 2-diethylaminoethylamine were stirred at 130°C for 4 hours. The reaction solution was introduced into 0.25 l of water and adjusted at pH 10 with 2 N hydrochloric acid. After being allowed to stand over night at room temperature, the crystalline precipitate was suction-filtered and recrystallized from ethanol. The substance dried on the steam bath contained 1 equivalent of crystal-ethanol.
Yield:: 9.0 g (61 percent of the theory), melting point: 195°–197°C

EXAMPLE 36

4-(2-aminobenzylamino)-6-(4-methylpiperazine-1-yl)-benzene-1,3-disulfonamide 14.7 g of 4-(2-aminobenzylamino)-6-chlorobenzene-1,3-disulfonamide (38 mmols), 15 g of N-methylpiperazine and 20 c.c. of ethylene glycol were stirred at 135°C for 4 hours. The reaction solution was introduced into 150 ml of 2 N hydrochloric acid and the brownish solution was cleared up by treating it with active charcoal. After adjusting the pH at 4 with concentrated ammonia, the amorphous by-products precipitated were separated by filtration and the filtrate was adjusted to pH 7.5 with ammonia. The yellowish crystalline precipitate was suction-filtered and washed with water and hot ethanol.
Yield: 3.5 g (20 percent of the theory), decomposition point: 225°C.

What is claimed is:
1. A basically -substituted benzene-1,3-disulfonamide of the formula

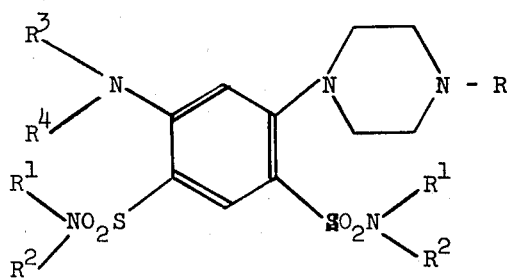

or an acid salt thereof wherein
R is lower alkyl;
$R^1$ and $R^2$ are each hydrogen, methyl, or ethyl;
$R^3$, taken alone, is hydrogen or lower alkyl;
$R_4$, taken alone, is hydrogen; allyl; lower alkyl; lower alkyl interrupted by O—, S—, SO—, $SO_2$—, N-methyl, or N-ethyl; cycloalkyl or cycloalkyl-alkyl having up to 8 carbon atoms; benzyl; phenethyl; phenylpropyl; benzyl, phenethyl, or phenylpropyl mono- or di-substituted in the phenyl nucleus thereof by halogen, alkyl or alkoxy having 1 to 2 carbon atoms, amino, monomethylamino, or dimethylamino; 2-furyl-methyl; 2-tetrahydrofuryl-methyl; or pyridyl-methyl;

or $R^4$, taken together with the N-atom to which they are attached are pyrrolidino, piperidino, hexamethyleneimino, morpholino, or 4-lower alkyl-piperzaine-1-yl.

2. A compound as claimed in claim 1, or an acid salt thereof, wherein R is methyl and $R^4$ is mono- or disubstituted benzyl.

3. A compound as claimed in claim 1, or an acid salt thereof, wherein R is methyl and $R^3$ and $R^4$, taken together with the N-atom to which they are attached, are 4-lower alkylpiperazine-1-yl.

4. A compound as claimed in claim 1 which is 4-benzylamino-6-(4-methyl-piperazin-1-yl)-benzene-1,3-disulfonamide or an acid salt thereof.

5. A compound as claimed in claim 1, which is 4-benzylamino-6-(4-methyl-piperazin-1-yl)-benzene-1,3-disulfonic acid-bis-methylamide or an acid salt thereof.

6. A compound as claimed in claim 1, which is 4-benzylamino-6-(4-methylpiperazin-1-yl)-benzene-1,3-disulfonic acid-bis-dimethylamide or an acid salt thereof.

7. A compound as claimed in claim 1 which is 4,6-di-(4-methylpiperazin-1-yl)-benzene-1,3-disulfonamide or an acid salt thereof.

* * * * *